United States Patent [19]

Hirano

[11] Patent Number: 4,615,006
[45] Date of Patent: Sep. 30, 1986

[54] PHYSICAL ADDRESS DEVELOPING UNIT

[75] Inventor: Nariaki Hirano, Tokyo, Japan

[73] Assignee: Nippon Electric Co., Ltd., Tokyo, Japan

[21] Appl. No.: 682,956

[22] Filed: Dec. 18, 1984

Related U.S. Application Data

[63] Continuation of Ser. No. 265,122, May 19, 1981.

[30] Foreign Application Priority Data

Jun. 6, 1980 [JP] Japan .................................. 55-76429

[51] Int. Cl.⁴ ............................................ G06F 12/06
[52] U.S. Cl. .................................................. 364/200
[58] Field of Search ... 364/200 MS File, 900 MS File

[56] References Cited

U.S. PATENT DOCUMENTS 4,385,352  5/1983  Bienvenu ........................... 364/200

Primary Examiner—Eddie P. Chan
Attorney, Agent, or Firm—Sughrue, Mion, Zinn, Macpeak and Seas

[57] ABSTRACT

An expanded memory field is obtained by forming a physical address for accessing a main memory unit according to the present invention. The physical address is developed following an address-mode provided in an instruction including an address field. When the address-mode is a "1", physical address is provided by (i) obtaining a base offset address from a base register which is given by a base register bank as determined by a first field of the address field, and (ii) adding the base address to a displacement number determined by a second field of the address to obtain an offset address, (iii) obtaining a segment base address from a segment base address register corresponding to a segment number register determined by the first field of the address, and (iv) adding together the segment base address and the offset address. A 24 bit physical address is obtained. When the address-mode is a "0", the address field constitutes the offset address and the above additions are carried out.

5 Claims, 8 Drawing Figures

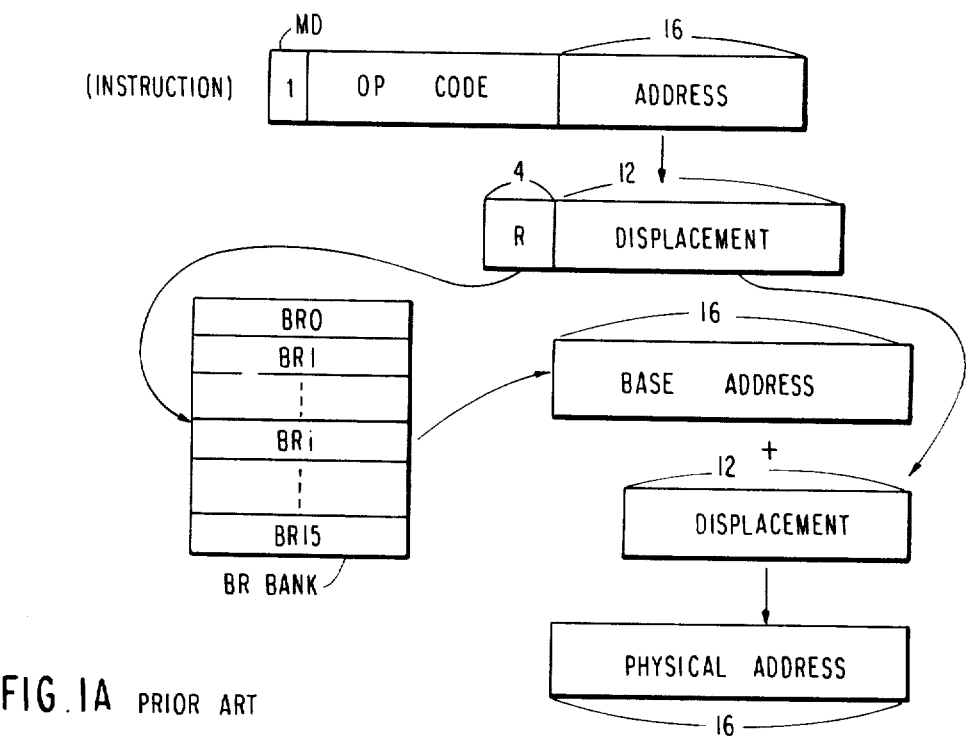
FIG.1A PRIOR ART
FIG.1B PRIOR ART
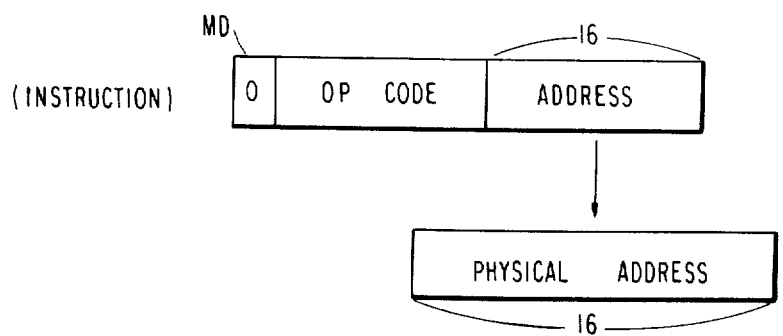

PHYSICAL ADDRESS DEVELOPING UNIT

BACKGROUND OF THE INVENTION

This invention relates to a physical address developing unit for a data processing (DP) system.

A method for forming a physical address in main memory field is proposed in "Processor Handbook PDP 11/45", pp. 147-165, published in 1971 by Digital Equipment Corporation. With this method, the designation of each of the physical addresses in the memory field divided into a plurality of segments is achieved by the use of a corresponding base address. More particularly, a plurality of base addresses corresponding to the segments are stored in a segment base address register (SBAR) bank. A physical address is produced by the sum of a selected base address corresponding to a segment and a displacement from the segment. Stated in detail, a virtual address of 16 bits (consisting of a 3-bit segment and a 13-bit displacement) is assumed to develop a physical address of 18 bits by adding an 18-bit base address in an SBAR selected by the segment of the virtual address to the displacement given by the same virtual address.

However, this method has the following disadvantages:

(a) Since the segment size is determined by the 13-bit SBAR, the assumable size is limited within the address space of 8 kilobytes.

(b) The memory field accessible at one time without changing the content of the SBAR is restricted within the space of 64 kilobytes.

(c) To achieve such an addressing operation, a desired segment field must be particularly prepared within each virtual address. Besides, much attention must be paid so that the displacement defined in each virtual address does not disturb the contents of the segment fields preset in SBAR bank, since each virtual address is produced by the sum of the SBAR content and the displacement as discussed above.

To solve the above-mentioned disadvantages, another addressing method is proposed in "AmZ 8000 Family Reference Manual, Principles of Operation, AmZ 8001/2 Processor Instruction Set," pp. 16-19, published in 1979 by Advanced Micro Devices, Inc. This second method permits the achievement of a data processing (DP) system with a comparatively small number of address bits, which may use the maximum possible memory field.

Since the second method employs a translation table corresponding to the SBAR bank used in the first addressing method, all the disadvantages (a) to (c) of the first method can be eliminated. However, with the second method, at most 8 base registers are used of the 16 registers, in addition to a pair of base registers, that are prepared. Consequently, an efficient addressing operation is not achieved.

SUMMARY OF THE INVENTION

An object of the present invention is therefore, to provide a physical address developing unit free from the above-mentioned disadvantages and with a comparatively small number of address bits defined by an instruction without using such SBAR bank as mentioned above.

Another object of the present invention is to provide a physical address developing unit which exhibits an improved addressing capability without imposing any restriction on the conventional programs running in a DP system.

According to one aspect of the present invention, there is provided a physical address developing unit at a central processing unit (CPU) to develop a physical address for accessing a main memory unit (MMU) whose field is divided into at least one segment.

The developing unit comprises:

a plurality of base registers for storing a plurality of offset addresses allotted for said at least one segment;

a plurality of segment base address registers for storing at least one segment base address allotted for said at least one segment;

a plurality of segment number registers provided in one-to-one correspondence to said base registers for storing the numbers allotted for each of said segment base address registers;

instruction storing means for storing a given instruction with a first field for indicating the number of one of said plurality of base registers and the number of one of said plurality of segment number registers and a second field for indicating the displacement from the offset address stored in said one base register designated by the first field;

first address developing means for developing a tentative physical address for accessing said MMU by the sum of the offset address in the base register designated by said first field of the given instruction and the displacement in said second field of the instruction; and second address developing means for developing a final physical address for accessing said MMU by the sum of the tentative physical address given from said first address developing means and the segment base address in said one segment address register designated by the number of said one segment number register which is designated by said first field of the given instruction.

BRIEF DESCRIPTION OF THE DRAWINGS

The present invention will be described in greater detail with reference to the accompanying drawings in which:

FIGS. 1A and 1B are diagrams describing a physical address formation using a conventional addressing means;

In the drawings, identical reference numerals denote identical structural elements.

DESCRIPTION OF THE PREFERRED EMBODIMENT

Referring to FIG. 1A, a prior art addressing means will first be described for a better understanding of the present invention. In FIG. 1A, an instruction comprises an operation (OP) code, an address, and an addressing-mode designating bit MD. A logical "1" of the bit MD indicates that a base address mode is set in a DP system. The address comprises a field R of 4 bits and a displacement field of 12 bits. The field R is used to designate one (BRi) of 16-bit base register (BR) bank (BR0 to BR15). The 16-bit base address stored in the selected BRi (i=0, 1, . . . , or 15) and the 12-bit displacement of the address given by the instruction are added to form a 16-bit physical address.

On the other hand, as shown in FIG. 1B, in response to "0" of the bit MD, the 16-bit address in the instruction directly shows a 16-bit physical address. With such a conventional addressing technique shown in FIGS. 1A and 1B, the assumable address field is restricted within the space of 64 kilobytes.

Figure 2:
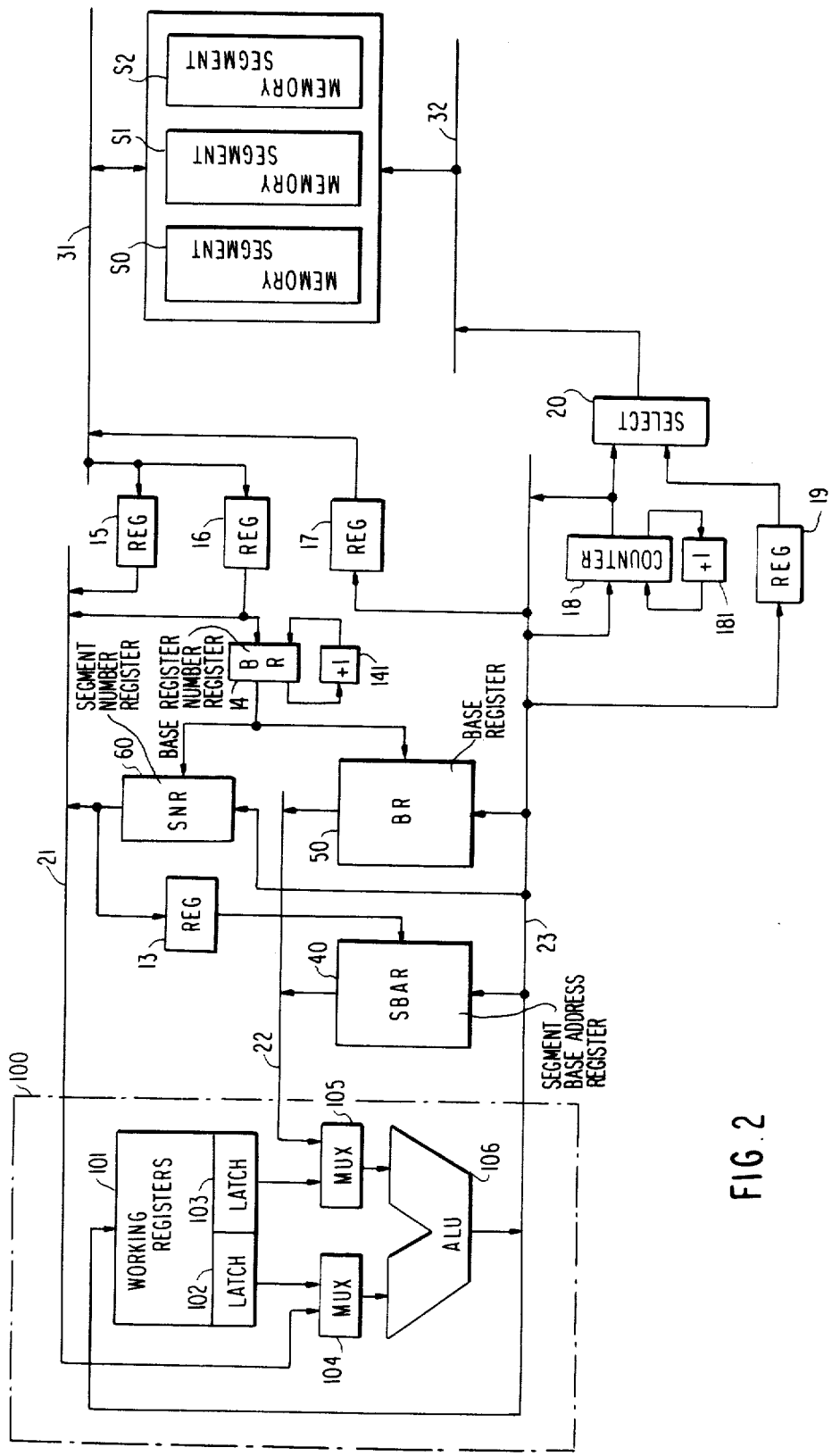
FIG. 2 shows a block diagram of one embodiment of the present invention.

Referring now to FIG. 2, it shows one embodiment of the environment in which a physical address is prepared. It includes a microprocessor 100 (having sixteen working registers 101, latch circuits 102 and 103, multiplexers 104, 105, and an arithmetic and logic unit 106), a segment base address register (SBAR) bank 40, a base register (BR) bank 50, a segment number register (SNR) bank 60, a 4-bit register 13, a base register (BR) number register 14, an instruction register 15, a read-data register 16, a write-data register 17, a program counter 18, a memory address register 19, a selector 20, a main memory unit (MMU) 30 having segments S0, S1, and S2, an A-bus 21, a B-bus 22, a Y-bus 23, a memory data bus (MD-bus) 31, and a memory address bus (MA-bus) 32.

For details of the microprocessor 100, reference is made to pp. 2-30 to 2-36 of "Advanced Micro Devices, the Am 2900 Family Data Book with Related Support Circuits," published in 1978 by Advanced Micro Devices, Inc. The microprocessor comprises the working registers 101 (each having 24 bits) and the arithmetic and logic unit (ALU) 106. The microprocessor is connected to the A-bus 21, the B-bus 22, and the Y-bus 23 (each of these buses having 24 bits). The register 101 is a 2 port-RAM (random access memory). Data read out of the register 101 is retained at the circuits 102 and 103. Data selected at the multiplexer 104 and data selected at the multiplexer 105 are sent to the ALU 106. The result of the operation performed at the ALU 106 is sent to the register 101 through the Y-bus 23. The SBAR bank 40, the BR bank 50, and the SNR bank 60 are composed of high speed RAMs of 24 bits×16 words, 16 bits×16 words, and 4 bits×16 words, respectively. The bank 60 and the banks 40, 50 are connected to the A-bus 21 and the B-bus 22, respectively. Each of the 24-bit SBAR bank 40, 16-bit BR bank 50, and 4-bit SNR bank 60 is connected to the Y-bus 23. The operation result of the ALU 106 is stored in the banks 40, 50, and 60. SBAR number read out from the bank 60 is stored in the 4-bit register 13 and then sent to the bank 40.

The 16-bit instruction register 15 and the 16-bit read-data register 16 are connected to the MD-bus 31. The bus 31 is a birectional 16-bit bus which serves to transmit the instruction and operand data read out from the MMU 30 to the registers 15 and 16. The OP code of the instruction is stored in the register 15 while the address in the instruction and the operand data are stored in the register 16. The contents of the registers 15 and 16 are sent to the microprocessor 100 through the A-bus 21. The register 17 has 16 bits and is connected to the Y-bus 23 and stores the result of the operation performed at the ALU 106. The content of the register 17 is written in the MMU 30 through the MD-bus 31.

The B-register number register 14 retains the field R of the address stored in the register 16. The content of the register 14 composed of a 4-bit counter is sent to the banks 50 and 60 as address information. The content of the register 14 is incremented by a counter 141. The memory address register 19 is a 24-bit register connected to the Y-bus 23 and serves to store the address of the MMU 30 produced by the microprocessor 100.

The 24-bit program counter (PC) 18 stores the address of the instruction stored in the MMU 30. The content of the register 18 is also incremented by the counter 181. The memory addresses of the counter 18 and the register 19 are selected at the selector 20 and sent to the MMU 30 through the 24-bit MA-bus 32. This embodiment can be most ideally applied to a microprogram control type system shown in FIG. 1 on page 331 of "IRE Transactions on ELECTRONIC COMPUTERS", published in 1962 by the Institute of Radio Engineering, Inc.

The procedure for developing the physical address used in the present invention will now be described.

Figure 3A:
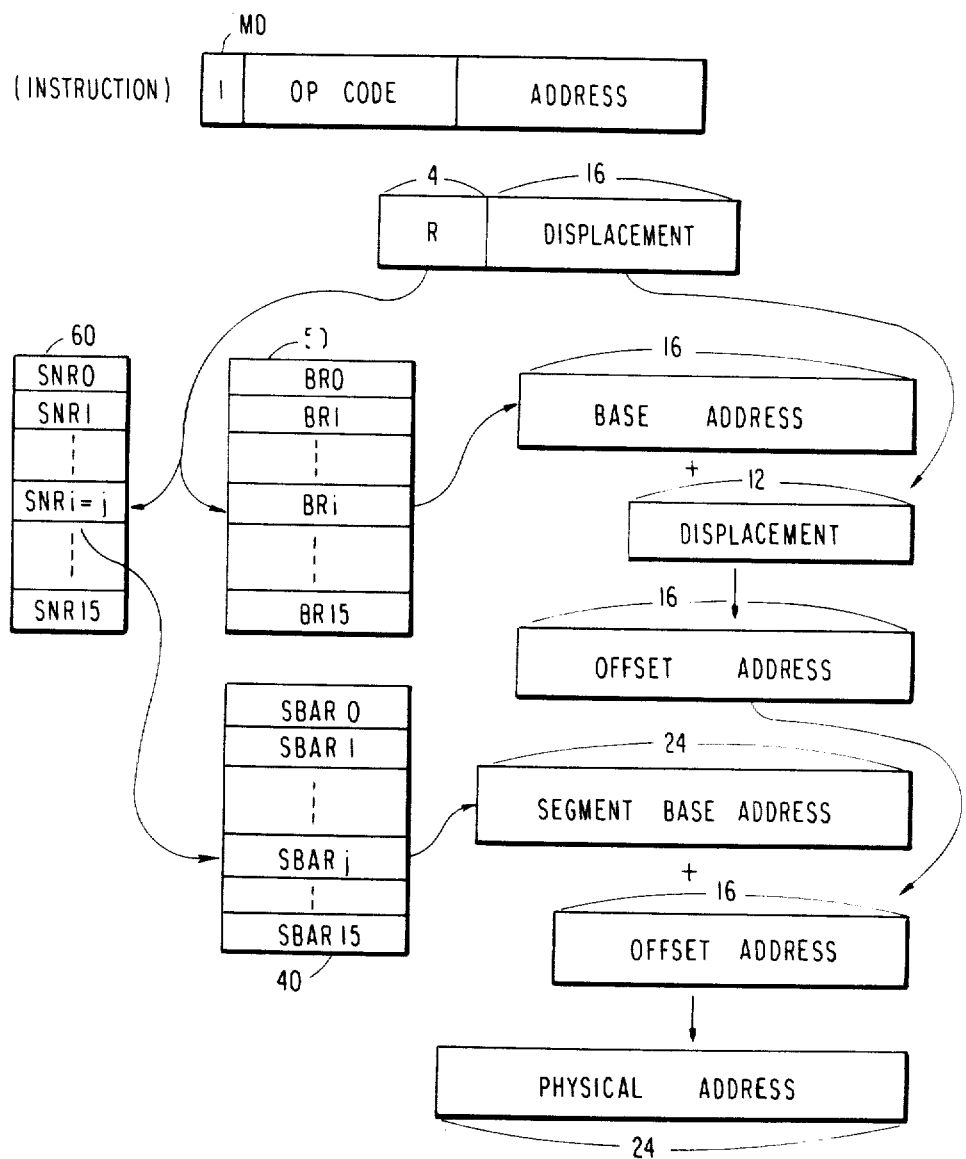
FIGS. 3A and 3B are diagrams for describing a procedure of the physical address formation achieved in the present invention.

Referring to FIG. 3A, the BR bank 50 (BR0 to BR15), the SBAR bank 40 (SBAR0 to SBAR15) for storing the segment base addresses, and the SNR bank 60 (SNR0 to SNR15) are employed for the physical address development. The bank 60 stores the numbers of all the bank 40.

In the presence of "1" of the bit MD, a procedure similar to that shown in FIG. 1A is followed. A 16-bit address is produced by adding the base address in the BRi selected by the content of the field R to the displacement stored in the read-data register 16. The 16-bit address is used as offset address information for designating an address of the MMU, which belongs to one of the three segments S0, S1, and S2. At the same time, the SNRi corresponding to the BRi selected by the content of the field R is referred, and the SBARj is referred by the SBAR number=j stored in thus referred SNRi. The 24-bit segment base address stored in the SBARj is then added to the offset address to produce a 24-bit physical address.

Figure 3B:
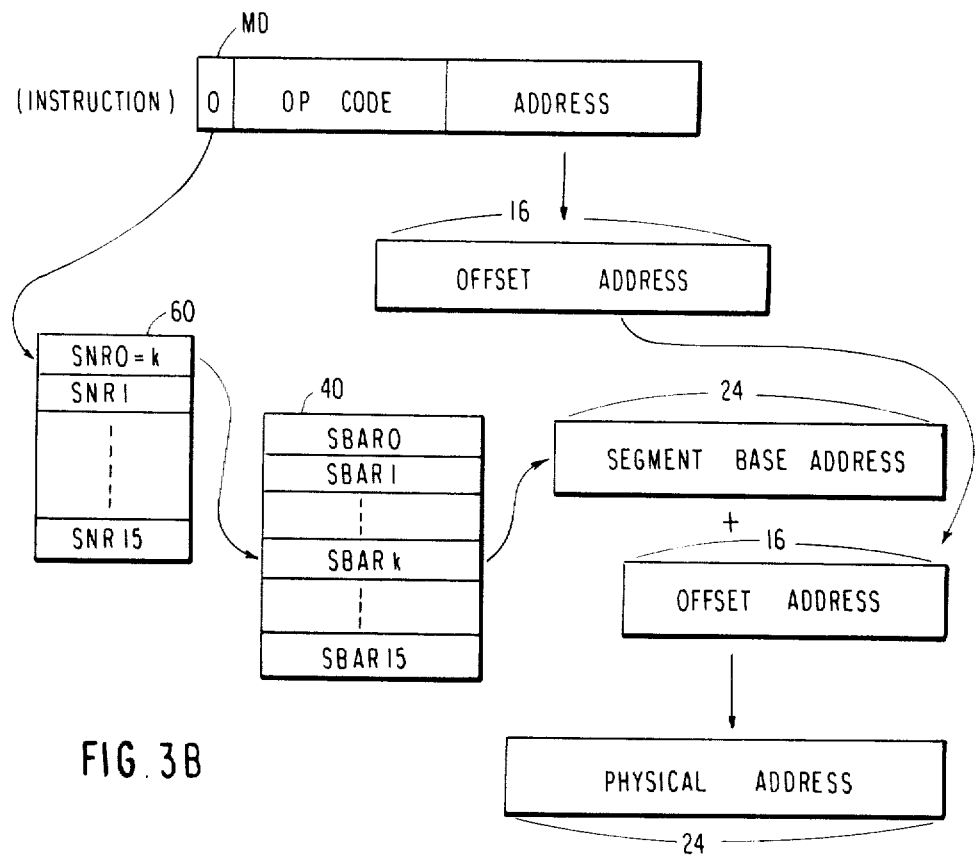

Referring now to FIG. 3B, in response to "0" of the bit MD, a 16-bit address in the register 101 directly becomes the 16-bit offset address. As a result, the SBARk is referred by the number=k given from the SNR0. The 24-bit segment base address stored at the referred SBARk and the offset address are added to form the 24-bit physical address.

The operation of the embodiment of the present invention is now described in further detail referring to FIGS. 2, 3A, and 3B. An instruction address of the counter 18 is supplied to the selector 20 and the MMU 30 through the MA-bus 32. The OP code of the instruction is read out from a memory position of the MMU 30 designated by the instruction address. The OP code of the instruction is set to the register 15 through the MA-bus 31. The content of the counter 18 is then incremented. The address portion of the instruction read out from the MMU 30 by the incremented address in the instruction is stored in the register 16. While such an instruction is being fetched, the content of the register 14 is cleared to "0000". The content of the SNR0 is then set at the register 13. The bit MD set at the register 15 is then checked by a CPU (now shown).

In the presence of "1" of the bit MD, the content of the field R of the address stored in the register 16 is set at the register 14. The content of the BRi designated by the register 14 is read out from the bank 50 and sent to the microprocessor 100 through the B-bus 22. At the same time, the displacement portion stored in the register 16 is sent to the microprocessor 100 through the A-bus 21. The selectors 104 and 105 provided at the microprocessor 100 respectively select the data sent through the A-bus 21 and the B-bus 22. The data selected is added at the ALU 107 and the result of the addition is stored at the register 101 through the Y-bus 23 as a 16-bit offset address. At this time point, the content of the register 14 indicates the initial storage point in the bank 60. The content "j" of the SNRi read out from the bank 60 is stored at the register 13. Since displacement information of the register 16 exists on the A-bus 21 at this point in time, the read out information from the bank 60 cannot be sent to the A-bus 21. Then, 24-bit segment base address of the SBARj designated by the content of the register 13 is given to the multiplexer 105 through the B-bus. The 16-bit offset address stored in the register 101 is read out to the multiplexer 104 so that this address is outputed from the multiplexer 104. The two addresses are added at the ALU 106, and the 24-bit physical address which is the result of the addition, is sent out to the Y-bus 23. The physical address on the Y-bus 23 is set in the register 19 (this physical address may be stored in the register 101).

At the time of the instruction fetch operation, in response to "0" of the bit MD, the content of the register 14 is cleared to "0000". The content of the register 14, pointing to the register SNR0, is then read out and set in the register 13. Accordingly, the content of the SBARk designated by the register 13 is read out from the bank 40 and given to the multiplexer 105 through the B-bus 22. The 16-bit offset address stored in the register 16 is also given to the multiplexer 104 through the A-bus 21. The outputs selected by the two multiplexers 104 and 105 are added at the ALU 106 to produce a 24-bit physical address. The physical address is stored in the register 19 or 101 through the Y-bus 23.

Thus, the present invention allows the memory field of 64 kilobytes of the MMU 30 to be expanded up to the memory field of 16 megabytes without imposing any restrictions on the conventional running programs. Also, the segment size may be extended up to 64 kilobytes at maximum, while the maximum memory field accessible at one time may be extended up to 1 megabyte without modifying the content of the bank 40. The bit number of the bank 60 shown in the embodiment was 4 bit, but it is possible to increase the number arbitrarily without imposing any restrictions on the number of the bank 40. All the sixteen registers may also be used as the BR bank.

Figure 4:
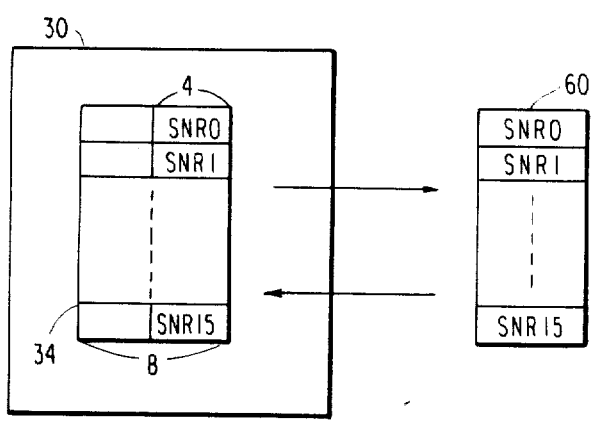
FIGS. 4, 5A, and 5B are block diagrams for describing practical examples of the present invention.

Referring to FIG. 4, the embodiment further comprises a 16-byte segment definition table (SDT) 34 provided at the MMU30 to store one SBAR number per byte, so that the batch storing and restoring operation, which will be described later, can be achieved between the MMU30 and the bank 60.

Detailed description of the batch storing operation in the bank 60 from the MMU30 will be given by referring to FIG. 3. The address for designating the table 34 shown in FIG. 4 is stored in the register 101 functioning as a specific register according to the physical address formation technique discussed earlier with reference to FIGS. 2, 3A, and 3B. The content of the register 14 is cleared to "0000". The address of the table 34 is given as one of the inputs of the ALU 106 from the register 101 through the circuit 102 and the multiplexer 104. To the other input terminal of the ALU 106 is supplied "0" forcibly. As a result, the output of the ALU 106 becomes the address for the designation of the table 34 and is set in the register 19 through the Y-bus 23. The address set in the register 19 is used to access the MMU30 through the selector 20 and the MA-bus 32. The SBAR number is read out byte by byte at the register 16 from the table 34 in the MMU30. The SBAR number information read out from the register 16 is supplied to one of the inputs of the ALU 106 through the A-bus 21 and the multiplexer 104. Since the other input of the ALU 106 is forcibly set to "0", the SBAR number information is produced on the Y-bus 23 and is set in the bank 60 indicated by the content of the register 14. Because one SBAR number is set in the bank 60, the content of the register 14 is incremented by the counter 141. The content of the register 101 storing the address for accessing the table 34 is incremented by the ALU 106.

On the other hand, the batch restoring operation, which is performed toward the table 34 from the bank 60 is performed as follows. The content of the register 14 is first cleared to "0000" in a manner similar to the above-mentioned batch storing operation. The address for designating the table 34 given from the register 101 is then set in the register 19 thrugh the circuit 102 and the multiplexer 104. The content of the bank 60 indicated by the content of the register 14 is then given to one of the inputs of the ALU 106 through the A-bus 21 and the multiplexer 104. Since "0" is forcibly supplied to the other input terminal of the ALU 106, the content of the register 12 is set at the register 17 through the Y-bus 23. The SBAR number information to be stored in the bank 60 and set at the register 17 is written in the table 34 of the MMU 30 designated by the address information of the register 19. Every time one SBAR number is written in the table 34, the content of the register 14 is incremented by the counter 141. As a result, the address information stored in the register 101 to designate the table 34 is incremented by the ALU 106.

Each of the multiplexers 104 and 105 used in the embodiment may be composed of the type shown at MUX on page 2-30 of Reference 3.

Figure 5A:
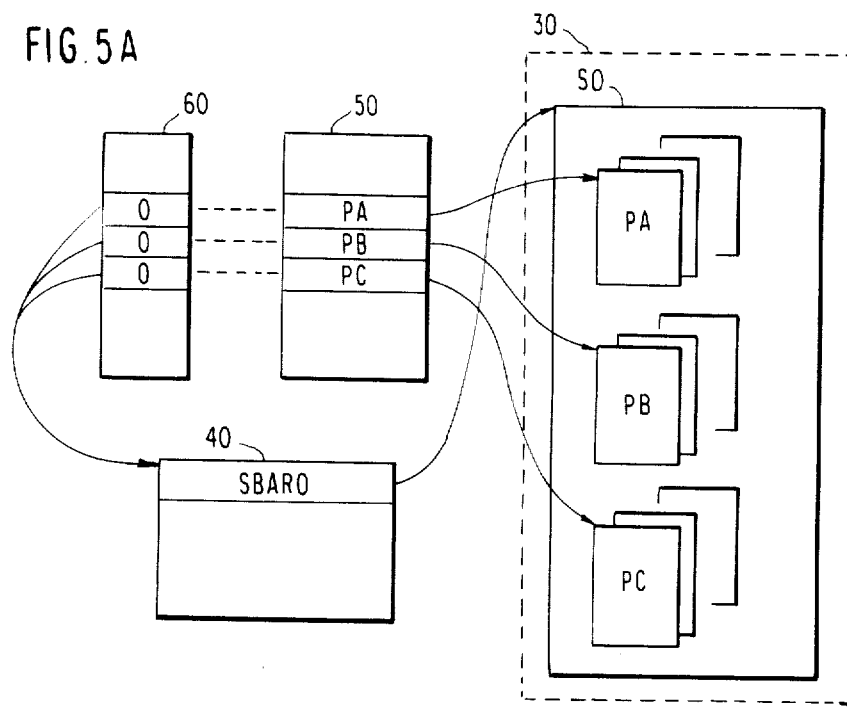
Figure 5B:
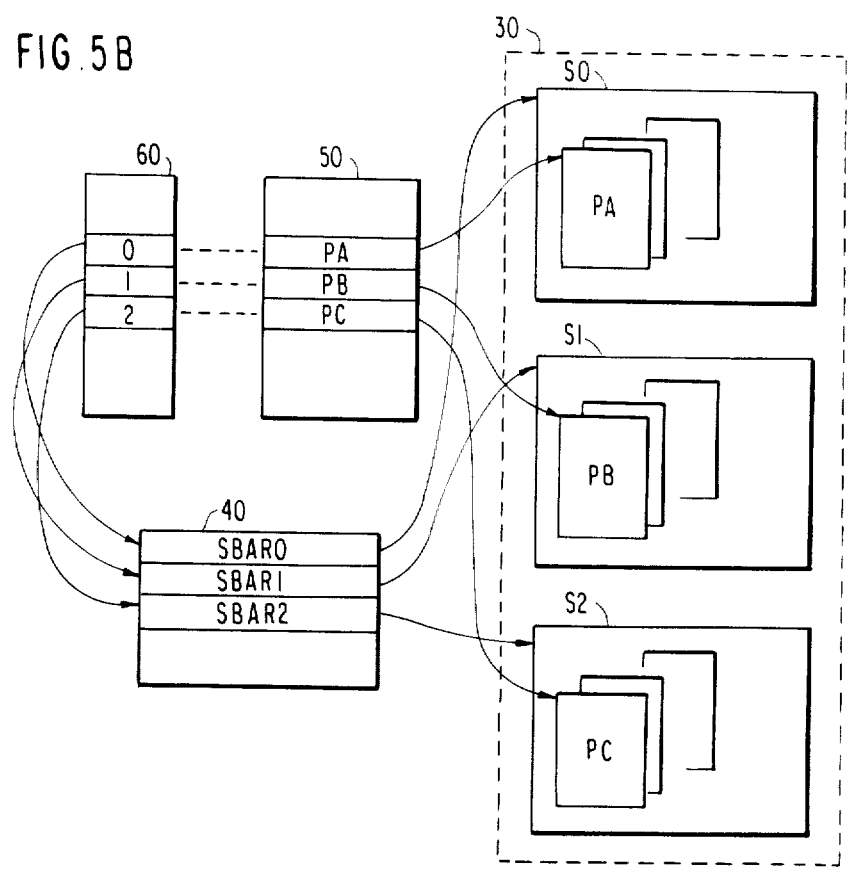

The present invention will be applied to the practical examples shown in FIGS. 5A and 5B. More specifically, the FIG. 5A example permits the access to a plurality of different programs PA, PB, and PC stored in the segment S0 of the MMU 30 using the banks 40, 50, and 60.

On the other hand, the FIG. 5B example allows access to the programs PA, PB, and PC stored in the segments S0, S1, and S2 of the MMU 30 using the same banks as those of FIG. 5A.

In this way, the adoption of the present invention does not require any changes in the conventional running programs to obtain the memory accessing operation described in FIGS. 5A and 5B.

Although the present invention has been described with reference to FIGS. 2, 3A, and 3B, many alternatives to the shown examples can be easily devised without departing from the spirit of the present invention.

What is claimed is:

1. A physical address developing unit provided at a central processing unit to develop a physical address, for accessing a main memory unit (MMU) whose field is divided into at least one segment, said address developing unit comprising:
   a plurality of base registers (50) for storing a plurality of base offset addresses in said segment;
   a plurality of segment base address registers (40) for storing at least one address allotted for said segment;
   a plurality of segment number registors (60) having one-to-one correspondence to said base registers for storing the numbers allotted for each of said segment base address registers;

instruction storing means for storing a given instruction having a control field having a first value and a second value, said instruction further including an address field having first and second fields, said first field designating one of said plurality of base registers and one of said plurality of segment number registers, and said second field of said address field indicating the displacement from the base offset address stored in said one base register designated by said first field;

first means coupled to said instruction storing means for determining whether said control field has said first value or said second value;

address storing means coupled to said first means and said instruction storing means for storing a first address corresponding to said first field when said control field has said first value and for storing a first address having a particular value when said control field has said second value;

first address developing means coupled to said instruction storing means and said address storing means for developing a memory offset address for accessing said MMU by obtaining the sum of the base offset address of the base register designated by said first address and the displacement as indicated by said second field of the instruction when said control field has said first value, and when said control field has the second value, said address field comprising said memory offset address; and second address developing means coupled to said address storing means to said first address developing means for developing a final physical address for accessing said MMU by obtaining the sum of the memory offset address given by said first address developing means and the segment base address in the segment base address register designated by the segment number register which is designated by said first address whereby the address developing unit can selectively execute two different kinds of addressing operations either using the base registers or without the base registers.

2. The unit of claim 1 wherein said address field comprises 16 bits; said first field comprising 4 bits and said second field comprising 12 bits.

3. The unit of claim 1 wherein the base offset address comprises 16 bits, the segment base address comprises 24 bits, said memory offset address comprises 16 bits and said final physical address comprises 24 bits.

4. The unit of claim 1,
said plurality of base registers comprising 16 bits × 16 words;
said plurality of segment base addresses comprising 24 bits × 16 words;
said plurality of segment number registers comprising 4 bits × 16 words.

5. A physical address developing unit as claimed in claim 1, wherein said base registers and segment number registers are independently programmable.

* * * * *